(12) United States Patent
Tofanicchio et al.

(10) Patent No.: US 11,516,494 B2
(45) Date of Patent: Nov. 29, 2022

(54) FUNCTIONAL SAFETY METHOD, SYSTEM, AND CORRESPONDING COMPUTER PROGRAM PRODUCT

(71) Applicant: STMicroelectronics S.r.l., Agrate Brianza (IT)

(72) Inventors: Giuseppe Tofanicchio, Brescia (IT); Nicola Marinelli, Mediglia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 151 days.

(21) Appl. No.: 16/142,465

(22) Filed: Sep. 26, 2018

(65) Prior Publication Data

US 2019/0098326 A1 Mar. 28, 2019

(30) Foreign Application Priority Data

Sep. 27, 2017 (IT) .................. 102017000108150

(51) Int. Cl.
| | | |
|---|---|---|
| *H04N 19/467* | (2014.01) | |
| *H04N 19/176* | (2014.01) | |
| *H03M 7/30* | (2006.01) | |
| *H04N 19/172* | (2014.01) | |
| *H04N 19/87* | (2014.01) | |
| *G06F 21/60* | (2013.01) | |
| *H04N 19/68* | (2014.01) | |

(52) U.S. Cl.
CPC .......... *H04N 19/467* (2014.11); *G06F 21/60* (2013.01); *H03M 7/30* (2013.01); *H04N 19/172* (2014.11); *H04N 19/176* (2014.11); *H04N 19/68* (2014.11); *H04N 19/87* (2014.11)

(58) Field of Classification Search
None
See application file for complete search history.

(56) References Cited

U.S. PATENT DOCUMENTS

| | | | |
|---|---|---|---|
| 5,612,979 | A | 3/1997 | Takano |
| 6,208,745 | B1 * | 3/2001 | Florencio ............... H04N 19/00 |
| | | | 382/250 |
| 2004/0101160 | A1 | 5/2004 | Kunisa |
| 2004/0190617 | A1 | 9/2004 | Shen et al. |
| 2006/0005029 | A1 | 1/2006 | Petrovic et al. |
| 2008/0285790 | A1 * | 11/2008 | Au ..................... H04N 1/32197 |
| | | | 382/100 |

(Continued)

OTHER PUBLICATIONS

Ali, Mohammed Athar et al., Improved Watermark Payload Capacity Using DE On IPCM Macroblocks in H.264/AVC,' EEE 5th International Conference on Computer Sciences and Convergence Information Technology, Nov. 30-Dec. 2010; 99. 594-599. (Year: 2010).*

(Continued)

*Primary Examiner* — Kaitlin A Retallick
(74) *Attorney, Agent, or Firm* — Slater Matsil, LLP

(57) ABSTRACT

A method, includes: providing at least one set of data; composing a data stream including compressed data from the at least one set of data, the at least one set of data having embedded therein a respective counter indicative of the at least one set of data, the respective counter being losslessly encoded into the compressed data; transmitting the data stream over a transmission channel; receiving the data stream; and recovering, from the data stream, the respective counter.

20 Claims, 5 Drawing Sheets

(56) References Cited

U.S. PATENT DOCUMENTS

| | | | |
|---|---|---|---|
| 2009/0110231 A1 | 4/2009 | Rzeszewski et al. | |
| 2012/0093356 A1 | 4/2012 | Seshadri et al. | |
| 2012/0300971 A1 | 11/2012 | Bause et al. | |
| 2014/0002735 A1 | 1/2014 | O'Mahony | |
| 2014/0184647 A1* | 7/2014 | Tessel | A61B 5/7425 345/634 |
| 2016/0035058 A1* | 2/2016 | Chalamala | G06T 1/005 382/100 |
| 2016/0080602 A1 | 3/2016 | Ishida et al. | |
| 2017/0316189 A1* | 11/2017 | Winograd | G06T 1/005 |

OTHER PUBLICATIONS

Zhang Z, Wu L, Yan Y, Xiao S, Sun H. An improved reversible image watermarking algorithm based on difference expansion. International Journal of Distributed Sensor Networks. Jan. 2017. doi:10.1177/1550147716686577 (Year: 2017).*

M. A. Ali and E. A. Edirisinghe, "Improved watermark payload capacity using DE on IPCM macroblocks in H.264/AVC," 5th International Conference on Computer Sciences and Convergence Information Technology, 2010, pp. 594-599, doi: 10.1109/ICCIT.2010.5711124. (Year: 2010).*

Ali, Mohammed Athar et al., "Improved Watermark Payload Capacity Using DE On IPCM Macroblocks in H.264/AVC," IEEE 5th International Conference on Computer Sciences and Convergence Information Technology, Nov. 30-Dec. 2010; 99. 594-599.

Pullaperuma, P. P. et al., "Taxonomy of file fragments using Gray-Level Co-Occurence Matrices," IEEE 2013 International Conference on Digital Image Computing: Techniques and Applications (DICTA); Dec. 23, 2013, 7 pages.

* cited by examiner

FUNCTIONAL SAFETY METHOD, SYSTEM, AND CORRESPONDING COMPUTER PROGRAM PRODUCT

CROSS-REFERENCE TO RELATED APPLICATIONS

This application claims priority to Italian Patent Application No. 102017000108150, filed on Sep. 27, 2017, which application is hereby incorporated herein by reference.

TECHNICAL FIELD

The present description relates to a functional safety method, system, and corresponding computer program product.

BACKGROUND

Functional safety of electric/electronic systems in the automotive field is regulated by standards such as e.g. the ISO26262 standard, which defines four Automotive Safety Integrity Levels (ASILs) and associated methods, metrics, processes and documents. Similar standards exist in other mission-critical domains (e.g. industrial, aerospace, other transportation).

Functional safety is an important factor for Advanced Driver Assistance System (ADAS) applications and, in the longer term, for fully autonomous driving.

The "frozen image" hazard is a major functional safety concerns for systems dealing with video acquisition, processing and display. It is relevant for Systems on Chip (SoCs) and systems including enough storage (memory) for enabling uncompressed and compressed full frame buffering.

For instance, compressed full frame buffering is applicable in systems using H.264 and H.265 video codecs; these are accepted video compression standards when an Ethernet-based video transmission system is used between video acquisition and video processing or between video processing and video display.

More generally, the "frozen data" hazard may be of concern for any system involving the production and consumption of data with buffer access synchronization.

A "frozen image" event can be defined as the unexpected re-use (processing or display) of obsolete image content in the place of a properly updated version which is notionally available. For systems involving the storage of full frames, images can get frozen inside memory buffers, when they are not properly refreshed before being read (either they are not refreshed at all or they are refreshed with an obsolete content).

When video encoders and decoders couples are present between video acquisition and display or video acquisition and processing, images can get frozen inside memory buffers storing the compressed full frames. Images can get frozen in memory buffers storing compressed full frames at the video encoder output, before its usage to compose the video stream for transmission. Also, images can get frozen in memory buffers storing compressed full frames at the video decoder input, after its extraction from the video stream.

Most commercially available image-processing IPs are based on full-frame storage (production towards addressable memory and/or consumption from addressable memory) and are inherently exposed to the frozen image hazard. A majority of them, for expected use in consumer market applications not targeting functional safety, do not provide any autonomous protection against that hazard.

The automotive sector is now moving towards automotive Ethernet cabling e.g. for facilitating the use of cameras (driver assist) and video (infotainment) connections. Measures countering the frozen image hazard e.g. in compressed full frame buffers may thus play an important role.

Improved solutions are thus desirable in order to address various issues as outlined above.

SUMMARY

An object of one or more embodiments is to contribute in providing such an improved solution.

One or more embodiments may relate to a corresponding system.

One or more embodiments may relate to a computer program product loadable in the memory of at least one data processing circuit (e.g. a computer or controller) and including software code portions implementing the method of one or more embodiments. As used herein, reference to such a computer program product is understood as being equivalent to reference to a computer-readable medium containing instructions for controlling a programmable data processing circuit in order to co-ordinate implementation of a method according to one or more embodiments. Reference to "at least one" data processing circuit is intended to highlight the possibility for one or more embodiments to be implemented in modular and/or distributed form.

One or more embodiments may provide a method of supporting end-to-end frozen image protection of compressed full frame buffers, based on lossless encoding of frame counter information embedded in uncompressed full frame buffers, e.g. as discussed in greater detail a co-pending Italian patent application filed on even date in the name of the same Assignee.

One or more embodiments may provide advantages related to the use of standard-compliant tools.

On the one hand, use of standard-compliant tools facilitates re-use of existing (e.g. consumer) standard-compliant video codec IPs in a functional safe context (e.g. automotive), thus avoiding modifications possibly involving features not compliant with existing video compression standards.

On the other hand, use of standard-compliant tools facilitates end-to-end transmission of lossless frame counter information in lossy compressed frame buffers.

Moreover, use of standard-compliant tools may avoid introducing drifts between a video encoder and a video decoder when embedding frame counter information, independently of the "group of picture" (GOP) structure.

Other advantages of one or more embodiments may derive from the use of external blocks, specific for frozen image detection and prevention, which are applicable also to uncompressed full frame buffers, to allow maximum re-use of hardware blocks and software development in end-system and application level.

In one or more embodiments no overhead information is added to the transported bit stream in order to embed pervasive frame counter information.

Additionally, in one or more embodiments, a user definable PCM macroblock map may facilitate controlling bit rate increase due to lossless coding to adapt to transmission link capacity.

One or more embodiments may adopt watermarking techniques, applied e.g. to video streams which may be compressed/decompressed.

In one or more embodiments, frame counter information can be applied (e.g. by watermarking) to a video frame at a certain area or zone, with lossless compression adopted at that area, so that de-compression may recover that area without losses, thus facilitating correct recovery (also) of the frame counter information.

Stated otherwise, in one or more embodiments, the compression/decompression procedure may process certain "privileged" zones in a lossless manner, while reconstruction loss may be acceptable for the remaining image portions.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

By way of general introduction, it will be once more recalled that, while the ensuing detailed description will refer for the sake of simplicity to images (e.g. video frames), the "freezing" hazard as addressed by one or more embodiments can extend to sampled data other than images (for instance, digitized radar echoes). Consequently, throughout the instant description, images/frames are to be construed as generally exemplary of sample data sets which may be exposed to corruption as exemplified e.g. by the hazard of becoming "frozen" with the disadvantages/risks associated to such corruption of information.

Also, throughout this description, the designation "IP" is used to indicate a semiconductor intellectual property core, IP core, or IP block, namely a reusable unit of logic, cell, or integrated circuit layout design. IP cores can be used as building blocks e.g. in application-specific integrated circuits (ASICs) or field-programmable gate arrays (FPGAs).

As noted, the automotive sector in now moving towards automotive Ethernet cabling e.g. for facilitating the use of cameras (driver assist) and video (infotainment) connections.

One or more embodiments may be applied to facilitating correct operation of a system in response to its inputs, including safe management of operator errors, hardware and software failures and environmental changes.

Figure 1:
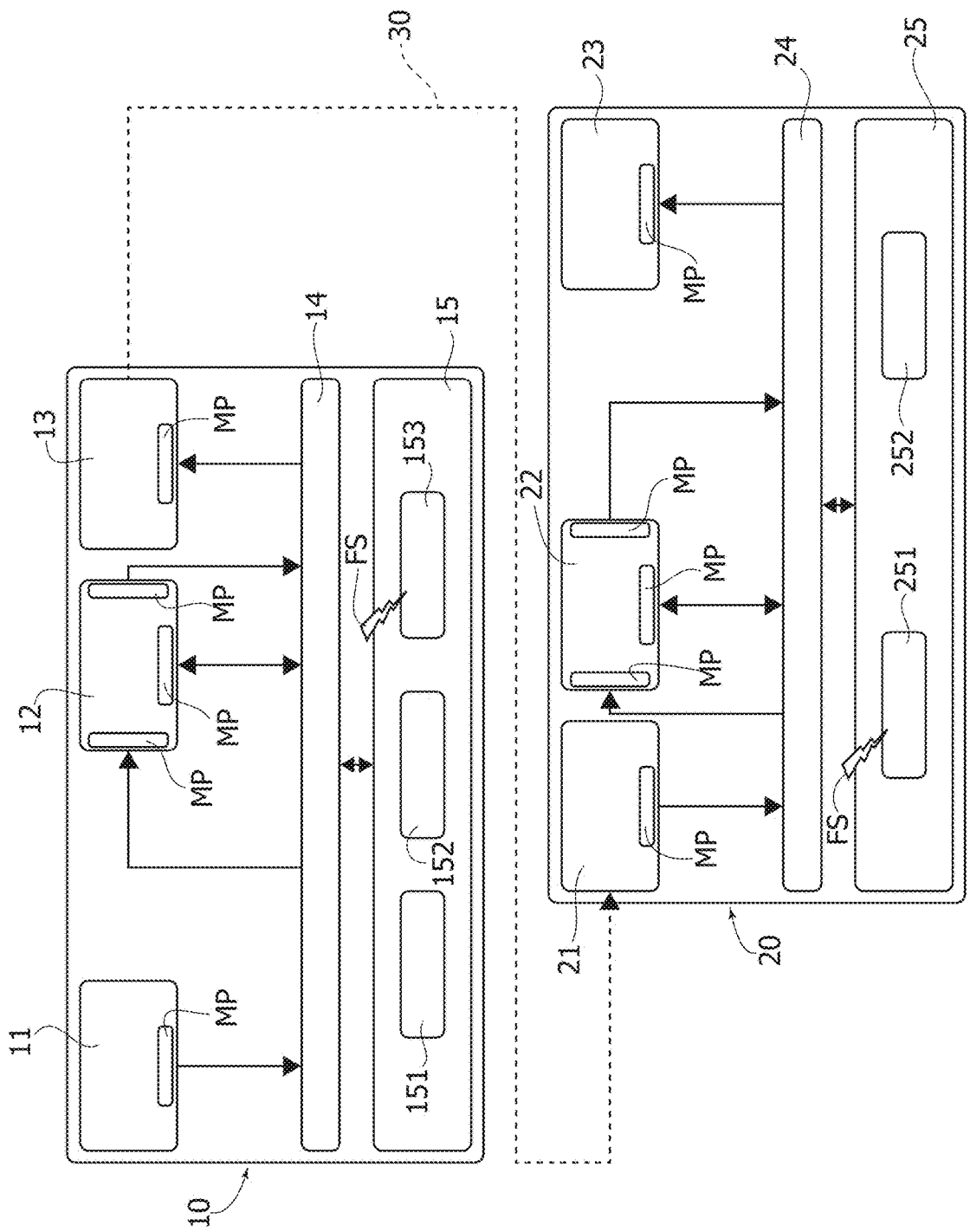
FIG. 1 is a block diagram exemplary of a video encoder-decoder (codec) layout.

The block diagram of FIG. 1 is exemplary of a video encoder/decoder system wherein a "transmitter" side 10 and a "receiver" side 20 can be identified linked by a communication channel 30 (of any known type, e.g. Ethernet cabling).

A system as shown in FIG. 1 can be regarded as conventional in the art, and may include the following part or elements. On the transmitter side 10, the system includes: a frame producer HW circuit block (e.g. coupled with a camera) 11 having a respective master port MP; a video encoder 12 having a plurality of respective master ports MP; a stream composer 13 for transmission over the channel 30, again including a respective master port MP; and a network on chip (NoC) and memory controller circuit block 14 interfacing the master ports MP of the circuit blocks 11, 12 and 13 with a memory device 15 including input uncompressed full frame buffer(s) 151, reference uncompressed full frame buffer(s) 152 and output compressed full frame buffer(s) 153. On the receiver side 20, the system includes: a stream extractor 21 for decoding having a respective master port MP; a video decoder 22 having a plurality of respective master ports MP; a frame consumer HW circuit block (e.g. coupled with a display screen or a video processing unit 23), again including a respective master port MP; and a network on chip (NoC) and memory controller circuit block 24 interfacing the master ports MP of the circuit blocks 21, 22 and 23 with a memory device 25 including input compressed full frame buffer(s) 251 and decoded frame buffer(s) 253.

Measures countering undesired phenomena such as the "frozen image" hazard (e.g. in compressed full frame buffers as indicated by FS in FIG. 1) may thus play a role in a system as discussed previously.

As discussed in greater detail a co-pending Italian patent application filed on even date in the name of the same Assignee, these countermeasures may include the usage of frame counter information embedded in the image (frame) data in order to provide an identity to the content of the compressed full buffers themselves.

If directly operating on compressed buffers, such countermeasures may suffer from various drawbacks.

For instance the frame counter can be extrapolated by the video codec header(s) as defined in standards, which may not be directly processed by the hardware, but rather pre-processed by the video codec control software, so that possible malfunctioning of the hardware itself may not be revealed.

In addition, a frame counter as defined in standard video codec header(s) is, by construction, instantiated in a single location of the buffer, which results in a fairly weak protection of the full compressed buffer content.

Certain ways of embedding frame counter information e.g. as watermarked information during compression processing may involve modifications in encoders and decoders. This militates against the use of standard-compliant compression video codec hardware. Embedding frame counter information as watermarked information after compression may involve the use of standard-dependent hardware to handle specific video stream units.

As used herein, watermarking will refer to including information in a certain set of data, with the capability of detecting and extracting such information, e.g. for gaining insight on its origin or provenance.

One or more embodiments as exemplified herein provide an end-to-end frozen image prevention and detection mechanism, which operates directly on uncompressed frame buffers, wherein embedding of frame counter information and checking that information is facilitated and made simple, making it possible to (indirectly) detect the occurrence of frozen image events in compressed full frame buffers.

Figure 2:
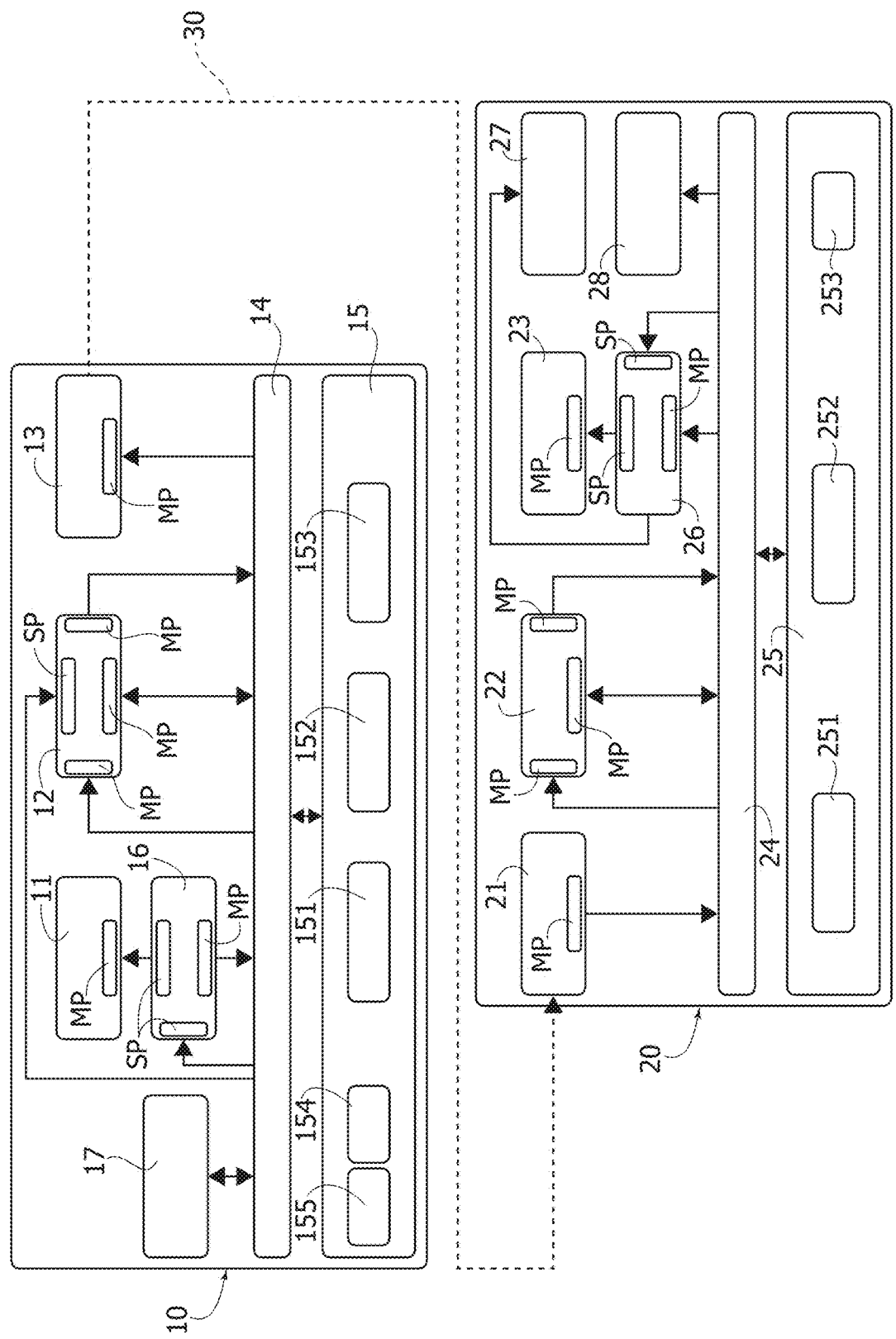
FIG. 2 is a corresponding block diagram exemplary of one or more embodiments.

One or more such embodiments are exemplified in the block diagram of FIG. 2.

In FIG. 2, parts or elements like parts or elements already discussed in connection with FIG. 1 are indicated with like references, and a corresponding description will not be repeated for brevity. Like in FIG. 1, in FIG. 2 MP denotes master ports, while the reference SP is introduced in FIG. 2 to designate slave ports.

In one or more embodiments as exemplified in FIG. 2, the video encoder circuit block 12 on the transmitter side 10 is configured to transfer without loss, by using standard-compliant coding tools, the pixels embedding frame counter information, as received from an (external) frame counter inserter circuit block 16, in the compressed full frame buffer.

On the receiver side 20, a standard-compliant decoder 22 decodes the compressed full frame buffers, which contain the frame counter information without compression loss.

In one or more embodiments as exemplified in FIG. 2, a frame counter extractor circuit block 26 will detect a mismatch with respect to the expected value in case a frozen image event has occurred in the compressed full frame buffer.

One or more embodiments as exemplified in FIG. 2 can exploit a frame counter inserter circuit block 16 and a frame counter extractor circuit block 26 which may otherwise be already present in the system in order to protect uncompressed full frame buffer transfers between system processing circuit blocks.

By considering more in detail the exemplary block diagram of FIG. 2, one may note that the building blocks on the transmitter side 10, acting as the compressed frame producer hardware circuit block, may include the memory device 15, coupled to the NoC 14, which is configured for storing—in addition to the input uncompressed full frame buffer(s) 151, the output compressed full frame buffer(s) 153 (possibly along with reference uncompressed frame buffer(s) 152)— also a map 154 of macroblocks to be encoded without loss as well as a map 155 of pixels to be watermarked with frame counter information. The transmitter side 10 may also include the NoC and memory controller 14, configured for providing a communication subsystem between the different circuit blocks of the transmitter side circuit block (e.g. SoCs) and a manager of the flow of data exchanged with the memory device 15. The transmitter side 10 may also include the uncompressed frame producer hardware 11, which is the source of the content of the input uncompressed frame buffer(s) and is configured for writing these data in the memory device 15, by being otherwise coupled via its output master port MP to an input slave port SP of the frame counter inserter circuit block 16. The transmitter side 10 may also include the frame counter inserter hardware (circuit block 16) which is configured for writing (watermarking) one or more frame counter instances(s) over the pixels (or padding) passing therethrough; this may occur at programmable pixel locations, according to information provided by the map of watermarked pixels 155.

As noted, the frame counter inserter circuit block 16 may include an input slave port SP coupled to the output master port MP of the uncompressed frame producer hardware 11 as well as a respective master port MP to the NoC 14. The frame counter inserter circuit block 16 may also include a further configuration slave port SP which is coupled to the NoC to receive the watermarked pixel map 155 e.g. via a transmitter CPU 17. The video encoder 12 may be a standard-compliant video encoder 12, configured for converting uncompressed images to a compressed standard-compliant format. Such a video encoder 12 can support macroblock lossless encoding using e.g. standard-compliant I_PCM macroblock types, and defines which macroblocks shall be encoded without loss in the image. As shown, the video encoder 12 is coupled to the NoC 14 via various master ports MP (e.g. input, output and input/output master ports) and a configuration slave port SP, which facilitates programming the map of lossless macroblocks 154 by the CPU 17. The transmitter side 10 may also include the transmitter side CPU 17, which is configured for programming, at transmitter set up time, the frame counter inserter circuit block 16 with pixels for frame counter embedding and video encoder 12 with macroblocks to be encoded without loss; and the stream composer 13 for transmission, which sends the output compressed full frame buffer(s) to the receiver side 20 over the channel 30 and is coupled to the NoC 14 via a reader master port MP.

In one or more embodiments: the watermarked pixels map 155 can be predetermined and contain pixels selected among the pixels available for frame counter embedding; and the lossless macroblock map 154 can also be predetermined and contain macroblocks containing pixels for frame counter embedding.

The pixels of the input uncompressed full frame buffer, which embed the frame counter information (in form of watermark), can be located in a given, video compression standard dependent, inner region of the macroblocks, in which the input uncompressed full frame is partitioned for the video encoding process.

It was observed that the locations of pixels available for frame counter embedding may turn out to be constrained by H.264 video format processing in the encoder 12, as exemplified in FIGS. 3a-3b, which are macroblock-based.

FIG. 3a is illustrative of a 16×16 luma macro block, while FIG. 3b is illustrative of an 8×8 chroma macro block. In both FIGS. 3a and 3b, the dashed areas indicate those pixels that are available for watermark insertion.

In one or more embodiments, the pixels carrying frame counter information shall be located in macroblocks to be encoded in a lossless way, that is I_PCM macroblocks, and also, shall not be processed by the video encoder in-loop de-blocking filter as a result of the in-loop de-blocking filter being enabled. In I_PCM macroblocks, the video encoder in-loop de-blocking filter is applied (at most) only on (by referring to H.264 as an example): the three pixels of the 16×16 luma macroblock boundaries (horizontal and vertical); and the two pixels of the 8×8 chroma macroblock boundaries (horizontal and vertical).

Figure 3:
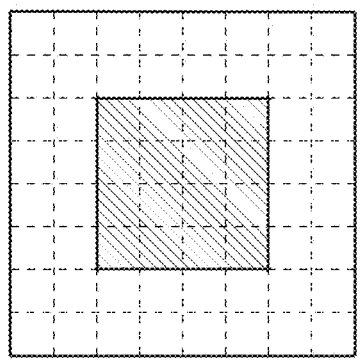
FIGS. 3a and 3b exemplary of video signal processing in one or more embodiments.
Figure 3:
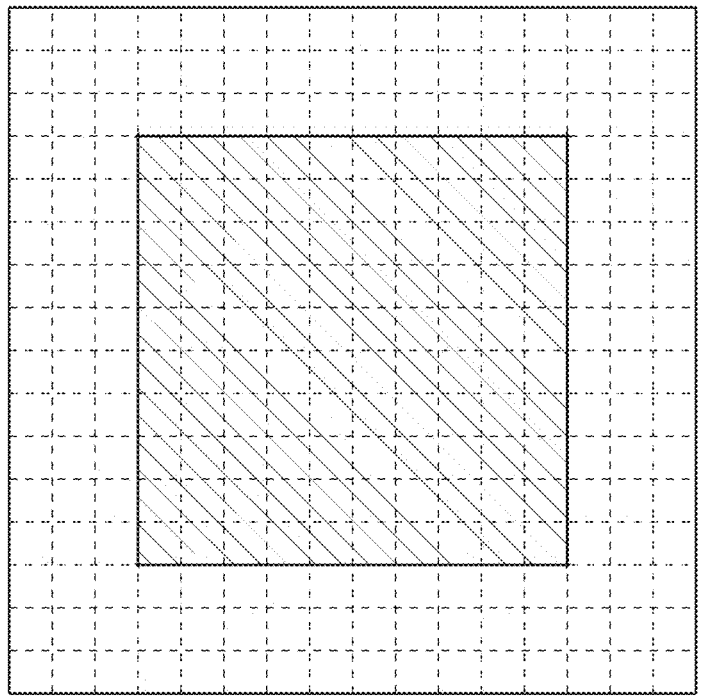

As shown in FIG. 3, in one or more embodiments, one or more frame counter instances can be stored in: 10×10 inner luma macroblock pixels, which carry uncompressed information when coded using I_PCM macroblocks; and 4×4 inner chroma macroblock pixels, which carry uncompressed information when coded using I_PCM macroblocks.

Briefly, in one or more embodiments, the inner region of the luma and chroma macroblocks, not processed by the in-loop de-blocking filter of the video compression standard, will be used for the insertion of the frame counter information, e.g. in the form of watermark.

In evaluating the difference between an original image and a decoded image in the case of images encoded exploiting I_PCM macroblocks (MBs) it was confirmed that the pixels at the center of the two images are the same while only up to three pixels, located at the edges of the I_PCM macro block, may be affected by filtering.

By considering again more in detail the exemplary block diagram of FIG. 2, one may note the possible presence of building blocks acting as compressed frame producer/consumer hardware.

In fact, in an arrangement as exemplified in FIG. 2 the transmitter side 10 produces compressed memory frames (which may be exposed to corruption such as "frozen image" events) which are transmitted e.g. via a stream slicer. The receiver side 20 in turn consumes compressed frames from the memory (exposed to possible corruption as "frozen image" events) via the stream slicer. The transmitter side can thus be regarded as a producer of compressed frames and the receiver side as a consumer of compressed frames.

In one or more embodiments, the building blocks on the receiver side 20, acting as the compressed frame consumer hardware circuit blocks, may include a stream slicer acting as the stream extractor 21, configured for receiving the compressed stream from the transmitter side 10 and writing the input compressed full frame buffer(s) 251 in the memory device 25 by being coupled to the NoC 24 via a writer master port MP. The receiver side 20 may further include the memory device 25, coupled to the NoC 24, including buffer(s) 251 configured for storing the input compressed full frame(s) and buffer(s) 252 for storing the output uncompressed full frame buffer(s) along with a map 253 of watermarked pixels. The receiver side 20 may further include the NoC and memory controller 24, configured for providing the communication subsystem between the different circuit blocks of the SoC on the receiver side 20 and the manager of the flow of data exchanged with the memory device 25. The receiver side 20 may further include the standard-compliant video decoder circuit block 22, configured for converting the images stored in compressed format to uncompressed images; it is coupled to the NoC 24 via reader and writer master ports MP. The receiver side 20 may further include the frame counter extractor hardware circuit block 26 configured for reading one or more frame counter instances over the pixels, at programmable pixels locations, according to the map 253 of the pixels that embed the frame counter instance(s). The frame counter extractor 26 may include frame counter logic to compare expected frame counter values with (e.g. plural) instance(s) of each frame counter and raise interrupt(s) towards a fault management (e.g. collection) circuit block 27 according to the results of comparison. In the example shown, the frame counter extractor 26 is coupled to the NoC 24 via a read master port MP to access the uncompressed full frame buffer(s) stored in the memory device 25, and with a programmable slave port SP enabling a CPU on the receiver side 20 to program the map 253 of watermarked pixels. As noted, the frame counter extractor 26 is coupled to the fault collection unit 27, e.g. with interrupt lines; it is also coupled via a writer slave port SP to the (full) frame consumer hardware circuit block 23. The receiver side 20 may further include the fault management/collection unit 27, coupled to the frame counter extractor 26 and configured for intercepting and handling the interrupts coming from the frame counter extractor 26. The receiver side 20 may further include the uncompressed frame consumer hardware 23, which is the destination of the content of the output uncompressed frame buffer(s) to which decoding is applied; it is coupled to the frame counter extractor 26 via a reader master port MP. The receiver side 20 may further include the receiver side CPU 28, which is configured for programming the frame counter extractor 26 with pixels contained in map 253 of the pixels that embed the frame counter.

In one or more embodiments, both in the frame counter inserter 16 and in the frame counter extractor 26, frame count increases are software-based and can be synchronised with associated video codec frame-ready interrupts.

Figure 4:
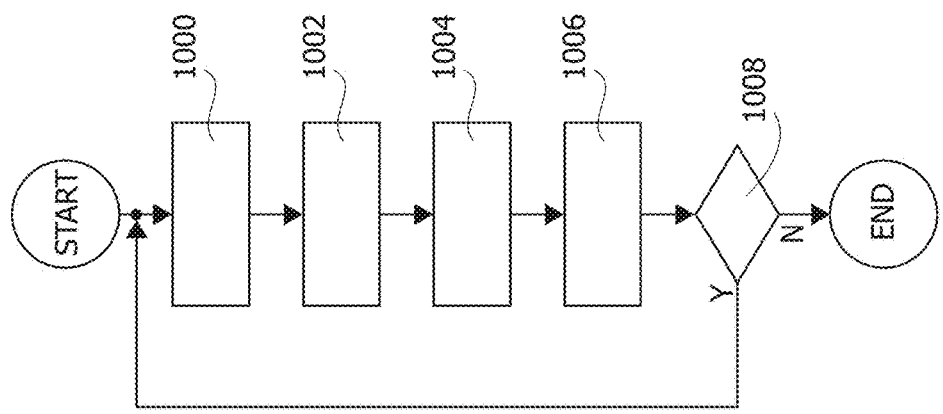

The flow chart of FIG. 4 is exemplary of possible data flow at the transmitter end 10 including the following acts. The flow chart of FIG. 4 includes step woo: at set up time, the CPU 17 reads the map of lossless macroblocks 154 from the memory device 15 to program the video encoder 12 and the watermarked pixels map 155 from the memory device 15 to program the frame counter inserter 16. The flow chart of FIG. 4 includes step 1002: as a result of output from the frame producer hardware 11, the frame counter inserter 16 writes one or more frame counter instances over the pixels passing therethrough, at locations determined by the programmed map of watermarked pixels 155 by writing them in the input uncompressed full frame buffer(s) 151 stored in the memory device 15; pixels which are not present in the map of watermarked pixels 155 are written in the input uncompressed full frame buffer(s) stored in memory device 15 without modifications; the geometry of the frame is preserved. The flow chart of FIG. 4 includes step 1004: the video encoder reads 12 the image from the input uncompressed full frame buffer 151 and converts it to a compressed format (possibly loss according to the compression ratio) save for the macroblocks of the lossless macroblock map 154, that convey the frame counter instance(s) compressed in a lossless format; the video encoder 12 writes the compressed image embedding the frame counter instance(s) in the output compressed buffer(s) 153 stored in the memory device 15. The flow chart of FIG. 4 includes step 1006: the stream composer 13 composes a video stream on the basis of the content of the output compressed full frame buffer(s) 153 and transmits it to the receiver side 20 over the channel 30. The flow chart of FIG. 4 includes step 100:—this step is exemplary of a check made as to whether system operation is to be continued. In the positive (outcome=Y), operation can be resumed at step 1002 as a result of further output received from the frame producer hardware 11. In the negative (outcome=N) operation is discontinued (END).

Figure 5:
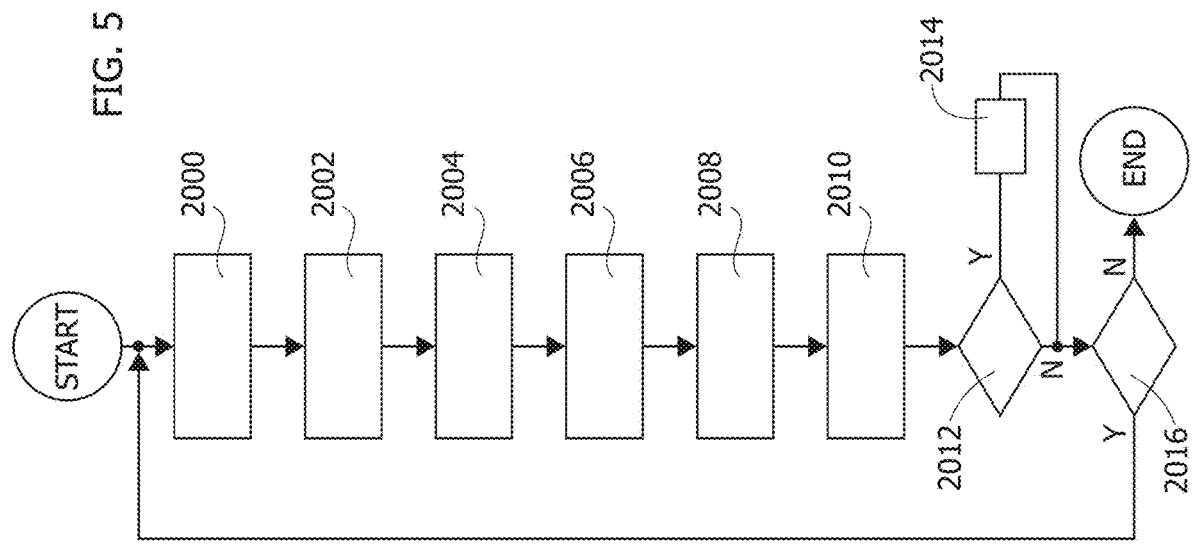
FIGS. 4 and 5 are flow charts exemplary of possible operation of one or more embodiments.

The flow chart of FIG. 5 is exemplary of possible information recovery data flow at the receiver end 20 including the following acts. The flow chart of FIG. 5 includes step 2000: at set up time, the CPU 28 reads the watermarked pixels map 253 from the memory device 25 to program the frame counter extractor 26; the watermarked pixel maps 155 and 253 at the receiver side 20 and at the transmitter side 10 are assumed to be synchronised. The flow chart of FIG. 5 includes step 2002: the stream extractor (slicer) 21 receives the video stream and writes the compressed images therein in the input compressed full frame buffer(s) 251 in the memory device 25. The flow chart of FIG. 5 includes step 2004: the video decoder 22 reads the compressed image from the input compressed full frame buffer(s) 251 and converts the compressed frame embedding the frame counter instance(s) into an uncompressed image, by writing them in the output decoded full frame buffer(s) 252 in the memory device 25. The flow chart of FIG. 5 includes step 2006: the uncompressed frames at the output of the video decoder 22 shall contain the frame counter information (e.g. in watermark form) without compression loss, over the pixels defined by the watermarked pixel map 253. The flow chart of FIG. 5 includes step 2008: the frame buffer consumer hardware 23 reads the image in the output from the decoded full frame buffer(s) 252 in the memory device 25. The flow chart of FIG. 5 includes step 2010: the frame consumer hardware 23 reads the decoded full frame from the memory 25 via the frame counter extractor 26; the frame counter extractor 26 recovers the frame counter information by reading it from the pixels passing therethrough at locations determined by the map of the watermarked pixels 253. The flow chart of FIG. 5 includes step 2012: this step is exemplary of a check made as to frame counter information mismatch with respect to the expected one, which may lead to detecting a frozen image event occurred in the compressed full frame, either in the transmitter side memory or in the receiver side memory, (outcome Y of step 2012) with a "mismatch detected" signal sent to the fault collection unit 27 for further application-dependent processing as exemplified by step 2014; such processing may include one or more options: issuing an alert signal indicative of a frozen image event having occurred or taking action (in a manner known per se) in order to palliate or remedy the undesired event are non-limiting examples of such processing. The flow chart of FIG. 5 includes step 2016: this step, which may be reached either from the step 2014 or directly from the step 2012 in the case of a negative outcome N of the check performed therein) is exemplary of a check made as to whether system operation is to be continued. In the positive (outcome=Y) operation can be resumed at step 2002 on new video stream information received. In the negative (outcome=N) operation is discontinued (END).

One or more embodiments, synchronisation of the frame counter inserter 16 and the frame counter extractor 26 is managed at application level.

One or more embodiments facilitate detection/avoidance/ countering the effects of frozen image events, e.g. in conjunction with a frame counter inserter 16 and a frame counter extractor 26 used in an end product.

One or more embodiments facilitate detection/avoidance of frozen image events by using H.264 and H.265 coding tools. One or more embodiments can be however applied in any system using multimedia codecs which support region-based lossless encoding of incoming data.

One or more embodiments can be equally applied to systems where compressed data are buffered in an addressable memory e.g. between different processing steps using a different frame buffer annotation which provides identity to the content of the frame buffer itself. One or more embodiments can thus be applied to end-to-end image corruption hazards.

One or more embodiments can be applied in systems where frame counter information is embedded either in payload pixels or in dummy pixels of the uncompressed frame buffer.

The latter case may apply e.g. to a frame counter embedded in an uncompressed image without image information loss. The dummy pixels can be added by the frame producer (e.g. circuit 11 in FIG. 2) and become an integral part of the image to be encoded by the video encoder (e.g. circuit 12 in FIG. 2), with the frame consumer 23 reading the decoded image and discarding the dummy pixels as regards further processing.

Figure 6:
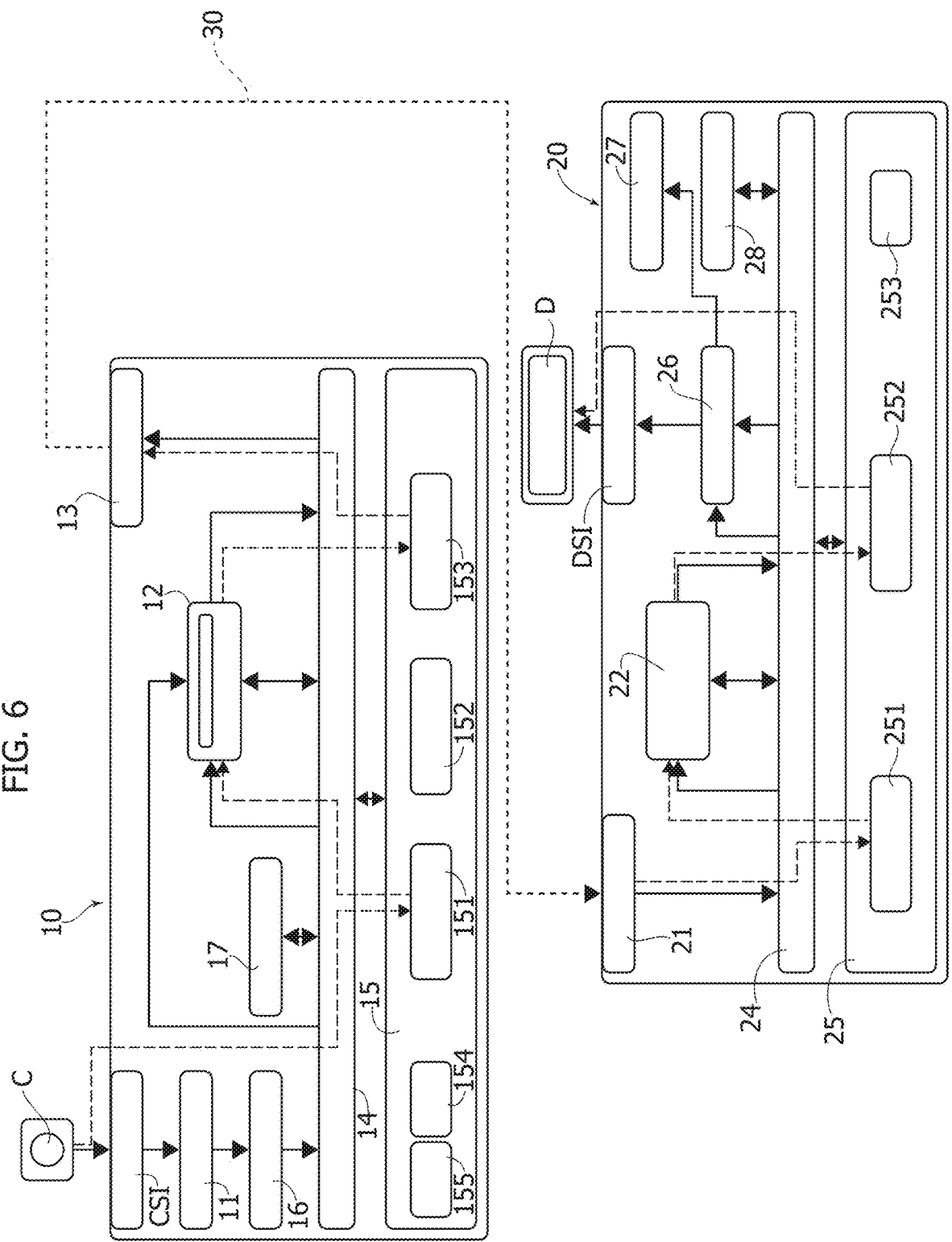
FIG. 6 is a further block diagram exemplary of one or more embodiments.

The block diagram of FIG. 6 is further exemplary of an application of one or more embodiments.

In FIG. 6, parts or elements like parts or elements already discussed in connection with FIGS. 1 and 2 are indicated with like references, and a corresponding description will not be repeated for brevity.

In a system as exemplified in FIG. 6, an imaging camera C (which may be a distinct element from the embodiments) is coupled to the transmitter SoC 10 via a camera serial interface CSA.

The image received from the camera images sensor C is processed by an image signal processor—ISP, which acts as full frame buffer producer ii. A frame counter inserter 16 inserts a frame counter (one or more instances) in the pixels predetermined by the watermarked pixel map 155 and writes it in the (e.g. DRAM) 15. A standard-compliant video encoder 12 which supports lossless encoding of macroblocks reads the watermarked images and converts them to a compressed video formats which is then stored in the DRAM memory 15 before transmission e.g. through an Ethernet bridge acting as the channel 30. The standard-compliant video encoder 12 will encode in a lossless manner the macroblocks containing the frame counter information, as discussed previously. A standard complaint video encoder can act as compressed full frame buffer producer.

The receiver SoC 20 receives the video stream via the Ethernet bridge (channel 30) and stores compressed images in its memory (e.g. DRAM) 25. A legacy, standard-compliant video decoder 22 can decode the compressed images and store then the uncompressed images in the DRAM 25. A standard complaint video decoder can act as compressed full frame buffer consumer. A display unit D (which may be a distinct element from the embodiments) can read the decoded frames via its display serial Interface—DSI, acting as the frame consumer hardware 23. The frame counter extractor 26 will be capable of detecting frozen image events, as discussed previously.

In one or more embodiments, a method may include: providing (e.g. via the frame producer circuit block 11) at least one set of data; composing (e.g. via stream composer circuit 13) a data stream including compressed data (e.g. buffer 153) from the at least one set of data having embedded therein (e.g. at frame counter inserter circuit 16) a respective counter indicative of the set of data (that is, which identifies the set of data) by lossless encoding the respective counter in the compressed data; transmitting (e.g. via stream composer 13, communication channel 30, stream extractor circuit 21) the composed data stream over a transmission channel (e.g. communication channel 30); and receiving the transmitted composed data stream and recovering therefrom (e.g. at frame counter extractor circuit 26, step 2010 in FIG. 5) the lossless encoded counter.

One or more embodiments may include: checking (e.g. at step 2012) the counter recovered against an expected reference counter value; and producing a mismatch signal (e.g. at step 2014, for instance an alert signal and/or a signal prompting action countering the effects of a freezing event) as a result of mismatch revealed by said checking between the counter extracted and the reference counter value.

Such an alert signal can thus be indicative also of a data freezing event having occurred in the compressed data (e.g. frame buffers 153, 251).

In one or more embodiments, the respective counter embedded in the at least one set of data may include a plurality of instances of the respective counter.

One or more embodiments may include watermarking (e.g. at frame counter inserter circuit 16, frame counter extractor circuit 26) the respective counter embedded in the at least one set of compressed data.

In one or more embodiments, composing the data stream may include macroblock-based encoding (see e.g. FIG. 3) and the respective counter is embedded in macroblock regions the are encoded in a lossless manner.

One or more embodiments may include embedding the respective counter in macroblock regions exempt from in-loop de-blocking processing, see e.g. the external regions of the luma and chroma macroblocks in FIG. 3, with de-blocking processing enabled.

One or more embodiments may include providing the at least one set of data as an image data block, wherein the respective counter includes an image frame counter.

In one or more embodiments at least one set of data may be included in a time sequence of data sets, wherein the respective counter is indicative of the position of the at least one data set in the time sequence (a mismatch signal issued as discussed previously may thus be indicative of a data freezing event having occurred in the compressed data e.g. frame buffers 153, 251).

A system according to one or embodiments may include: a source (e.g. frame producer hardware 11, imaging camera C, CSI) at least one set of data; a data stream composing circuit (e.g. circuits 11 to 16) configured for composing a data stream including compressed data (e.g. frame buffer 153) from the at least one set of data having embedded therein (e.g. at frame counter inserter circuit 16) a respective counter indicative of the set of data by lossless encoding the respective counter in the compressed data; a transmission channel (e.g. communication channel 30) coupled to the data stream composing circuit for transmitting the composed data stream; and a receiver circuit (e.g. receiver 20) coupled to the transmission channel and configured for recovering from the transmitted composed data stream the lossless encoded counter, wherein the system is configured for operating with the method of one or more embodiments.

One or embodiments may include a computer program product, loadable in the memory of at least one processing circuit (e.g. transmitter 10 and/or receiver 20) and including software code portions for performing the steps of a method according to one or more embodiments.

Without prejudice to the underlying principles, the details and embodiments may vary, even significantly, with respect to what has been described by way of example only, without departing from the extent of protection.

What is claimed is:

1. A method, comprising:
   composing, at a transmitter, a data stream comprising a compressed format of a data set using a macroblock-based encoding, the data set comprising a first subset and a second subset, each data in the first subset having embedded therein a respective counter indicating a watermark in accordance with a first watermark map, each respective counter being losslessly encoded in the data set, the first watermark map being predetermined and stored in a memory of the transmitter;
   embedding the respective counter in macroblock regions of the compressed format of the data set that are encoded in a lossless manner and that are exempt from in-loop de-blocking processing;
   transmitting the data stream over a transmission channel from the transmitter to a receiver; and
   recovering, by the receiver, each respective counter from each data in the first subset in accordance with a second watermark map, the first watermark map being synchronized with the second watermark map over the transmission channel, the second watermark map stored in a memory of the receiver.

2. The method of claim 1, further comprising detecting a mismatch in the data stream in accordance with mismatch between a recovered counter and an expected counter, and, based thereon, producing a mismatch signal indicative of a frozen image event.

3. The method of claim 1, wherein the respective counter embedded in each data in the first subset comprises a plurality of instances of the respective counter.

4. The method of claim 1, further comprising watermarking each data in the first subset in accordance with the first watermark map, a selection of the data in the first subset being predetermined based on the first watermark map.

5. The method of claim 1, wherein the data set comprises an image data block, and wherein the respective counter comprises an image frame counter of the image data block.

6. The method of claim 1, wherein the data set is included in a time sequence of data sets, and wherein the respective counter is indicative of a position of the data set in the time sequence of data sets.

7. A system, comprising:
   a data stream composing circuit configured to:
      compose a data stream comprising a compressed format of a data set using a macroblock-based encoding, the data set comprising a first subset and a second subset, each data in the first subset having embedded therein a respective counter indicating a watermark in accordance with a first watermark map, each respective counter being losslessly encoded in the data set, the first watermark map being predetermined and stored in a memory coupled to the data stream composing circuit, and
      embed the respective counter in macroblock regions of the compressed format of the data set that are encoded in a lossless manner and that are exempt from in-loop de-blocking processing;
   a transmission channel coupled to the data stream composing circuit and configured to transmit the data stream; and
   a receiver circuit coupled to the transmission channel and configured to recover each respective counter from each data in the first subset in accordance with a second watermark map, the first watermark map being synchronized with the second watermark map over the transmission channel, the second watermark map stored in a memory coupled to the receiver circuit.

8. The system of claim 7, further comprising a frame counter extractor circuit configured to detect a mismatch between a recovered counter and an expected counter, and, based thereon, produce a mismatch signal indicative of a frozen image event.

9. The system of claim 7, wherein the respective counter embedded in each data in the first subset comprises a plurality of instances of the respective counter.

10. The system of claim 7, wherein the data stream composing circuit is configured to watermark each data in the first subset in accordance with the first watermark map, a selection of the data in the first subset being predetermined based on the first watermark map.

11. The system of claim 7, wherein the data set comprises an image data block, and wherein the respective counter comprises an image frame counter of the image data block.

12. The system of claim 7, wherein the data set is included in a time sequence of data sets, and wherein the respective counter is indicative of a position of the data set in the time sequence of data sets.

13. A computer program product, loadable in a non-transitory memory of at least one processing circuit, comprising instructions for:
- composing, by a transmitter, a data stream comprising a compressed format of a data set using a macroblock-based encoding, the data set comprising a first subset and a second subset, each data in the first subset having embedded therein a respective counter indicating a watermark in accordance with a first watermark map, the respective counter being losslessly encoded in the data set, the first watermark map being predetermined and stored in a memory of the transmitter;
- embedding the respective counter in macroblock regions of the compressed format of the data set that are encoded in a lossless manner and that are exempt from in-loop de-blocking processing;
- transmitting the data stream over a transmission channel from the transmitter to a receiver; and
- recovering, by the receiver, each respective counter from each data in the first subset in accordance with a second watermark map, the first watermark map being synchronized with the second watermark map over the transmission channel, the second watermark map stored in a memory of the receiver.

14. The computer program product of claim 13, further comprising instructions for detecting a mismatch in the data stream in accordance with a mismatch between a recovered counter and an expected counter, and, based thereon, producing a mismatch signal indicative of a frozen image event.

15. The computer program product of claim 13, wherein the respective counter embedded in each data in the first subset comprises a plurality of instances of the respective counter.

16. The computer program product of claim 13, further comprising instructions for watermarking each data in the first subset in accordance with the first watermark map, a selection of the data in the first subset being predetermined based on the first watermark map.

17. The computer program product of claim 13, wherein the data set comprises an image data block.

18. The computer program product of claim 17, wherein the respective counter comprises an image frame counter of the image data block.

19. The computer program product of claim 13, wherein the data set is included in a time sequence of data sets.

20. The computer program product of claim 19, wherein the respective counter is indicative of a position of the data set in the time sequence of data sets.

* * * * *